US008577832B2

(12) United States Patent
Steinbeck et al.

(10) Patent No.: US 8,577,832 B2
(45) Date of Patent: Nov. 5, 2013

(54) SYSTEM, METHOD, CIRCUIT AND ASSOCIATED SOFTWARE FOR LOCATING AND/OR UPLOADING DATA OBJECTS

(76) Inventors: Dean Steinbeck, Montevideo (UY); Johnathan Podemsky, Cambridge, MA (US); Yoav Podemsky, Tel Aviv-Yafo (IL)

(*) Notice: Subject to any disclaimer, the term of this patent is extended or adjusted under 35 U.S.C. 154(b) by 0 days.

(21) Appl. No.: 13/281,537

(22) Filed: Oct. 26, 2011

(65) Prior Publication Data

US 2013/0060745 A1    Mar. 7, 2013

Related U.S. Application Data

(60) Provisional application No. 61/530,010, filed on Sep. 1, 2011.

(51) Int. Cl.
*G06F 7/00*      (2006.01)
*G06F 17/00*    (2006.01)

(52) U.S. Cl.
USPC .......................................... 707/602

(58) Field of Classification Search
USPC ................................. 707/602, 899
See application file for complete search history.

(56) References Cited

U.S. PATENT DOCUMENTS

| 2004/0080505 A1* | 4/2004 | Miyaji et al. ............. 345/418 |
| 2004/0111415 A1* | 6/2004 | Scardino et al. ............ 707/10 |
| 2009/0234811 A1* | 9/2009 | Jamil et al. ................ 707/3 |

* cited by examiner

*Primary Examiner* — Hosain Alam
*Assistant Examiner* — Van Oberly
(74) *Attorney, Agent, or Firm* — Vladimir Sherman; Professional Patent Solutions

(57) ABSTRACT

The present invention includes methods, circuits, systems and corresponding executable code for locating and managing data files/objects such as image files, audio files, etc. According to some embodiments of the present invention, there may be provided a Dynamic Search and Linking Module (DSLM), which DSLM may be functionally associated with an Uploader (an application or module adapted to upload files) of an application or of an operating system. The DSLM may provide an Uploader with search engine querying (e.g. web searching) and search engine result (e.g results of a web search) linking functionality.

20 Claims, 5 Drawing Sheets

SYSTEM, METHOD, CIRCUIT AND ASSOCIATED SOFTWARE FOR LOCATING AND/OR UPLOADING DATA OBJECTS

PRIORITY CLAIMS

This application claims priority from:
U.S. Provisional Patent Application No. 61/530,010, titled "A System, Method, Circuit and Associated Software for Locating and/or Uploading Data Objects", filed in the USPTO by the inventors of the present application on Sep. 1, 2011, which is hereby incorporated into the present description in its entirety.

FIELD OF THE INVENTION

The present invention generally relates to the field of file management. More specifically, the present invention relates to systems, methods, circuits and associated software for locating and/or uploading data objects.

BACKGROUND

As new smart devices, such as the iPad and iPhone, are becoming more common, more applications are being introduced. While the simple user interface attracts more users, it also raises many challenges to developers. New smart devices mask the file system away from the users, and many ordinary actions done in a file oriented system are not feasible. One example would be: how would one upload an attachment to an email, when one cannot select a file? Or, how would one download a data object from an exterior source and then upload it to a running application?

SUMMARY OF THE INVENTION

The present invention includes methods, circuits, systems and corresponding executable code for managing data files/objects such as image files, audio files, etc. According to some embodiments of the present invention, there may be provided a Dynamic Search and Linking Module (DSLM) functionally associated with an Uploader (an application or module adapted to upload files) of an application and/or of an operating system. The DSLM may provide an Uploader with search engine querying (such as a web search) and search engine result (such as the results of a web search) linking functionality. The DSLM may be instanced or may otherwise become visible to a user when an Uploader or other application prompts a user to enter a file selection or data object to be uploaded and/or upon user activation. The DSLM may thereafter provide the user with options to respond to the Uploader file/object selection prompt/request with (1) a search engine query, which may allow the user to enter query terms; and/or (2) a search engine result selection—such that a selected search engine result may be dynamically linked as the input to the file/object selection prompt, field, pointer or other designator used by the Uploader to designate a file/object (location) to upload.

According to some embodiments of the present invention, when a File-System/data-repository Explorer/browser is called upon by an Uploader of an application or of an operating system and/or when a user of an operating system desires to upload a file or data object, the DSLM may be instanced, automatically or by the user, and may either augment the functionality (e.g. as a plug-in) of a File-System/data-repository Explorer/browser or may replace the File-System/data-repository Explorer/browser, when the explorer/browser is called upon by an application, web-form or user requesting a user selection of a file or data object (e.g. for uploading).

According to some embodiments of the present invention, the DSLM may include or be functionally associated with a Search Engine Interface Module (SEIM) adapted to communicate with one or more Application Programming Interfaces ("API"'s) of search engines (e.g. Google), and/or similar devices. The DSLM, through the SEIM, may be adapted to forward to the search engine one or more file/data-object related search/query terms (e.g. picture of a clown or a picture of tree) provided by a user. The DSLM may be further adapted to add or modify search criteria sent based on the purpose of the search (i.e. if the field to be filled out requires a logo, the DSLM may add the term "Logo" to the search criteria). Search results generated by the search engine may be received by the DSLM through the SEIM and may be provided to a user through an interface screen which allows the user to select one of the search engine results for uploading.

According to some embodiments of the present invention, once a file or data object, from the search results, has been selected by a user, a DSLM may provide an Uploader with a direct link to the selected file or data object residing on a remote server. According to further embodiments of the present invention, data associated with a selected file or data object from a remote server may be downloaded to a local buffer or associated data storage and the Uploader may be provided with a link or pointer to the locally buffered/stored data. According to yet further embodiments, a DSLM may be included in an Uploader such that the file/data object may be directly uploaded to the target destination upon selection by the user.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
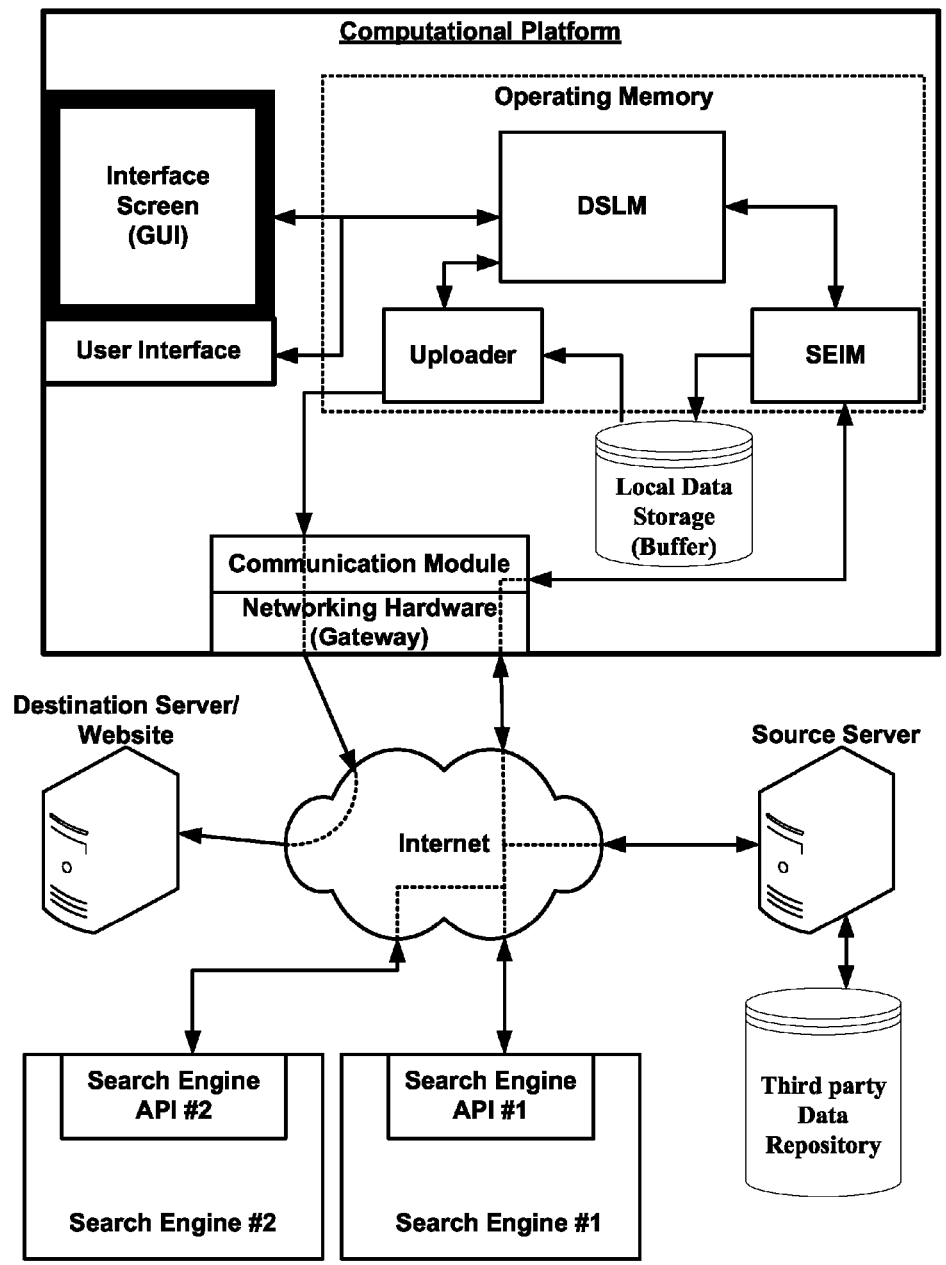
FIG. 1: is a block diagram of an exemplary system for managing data files/objects, in which data files/objects are stored in a local buffer or storage prior to being uploaded, in accordance with some embodiments of the present invention.
Figure 2:
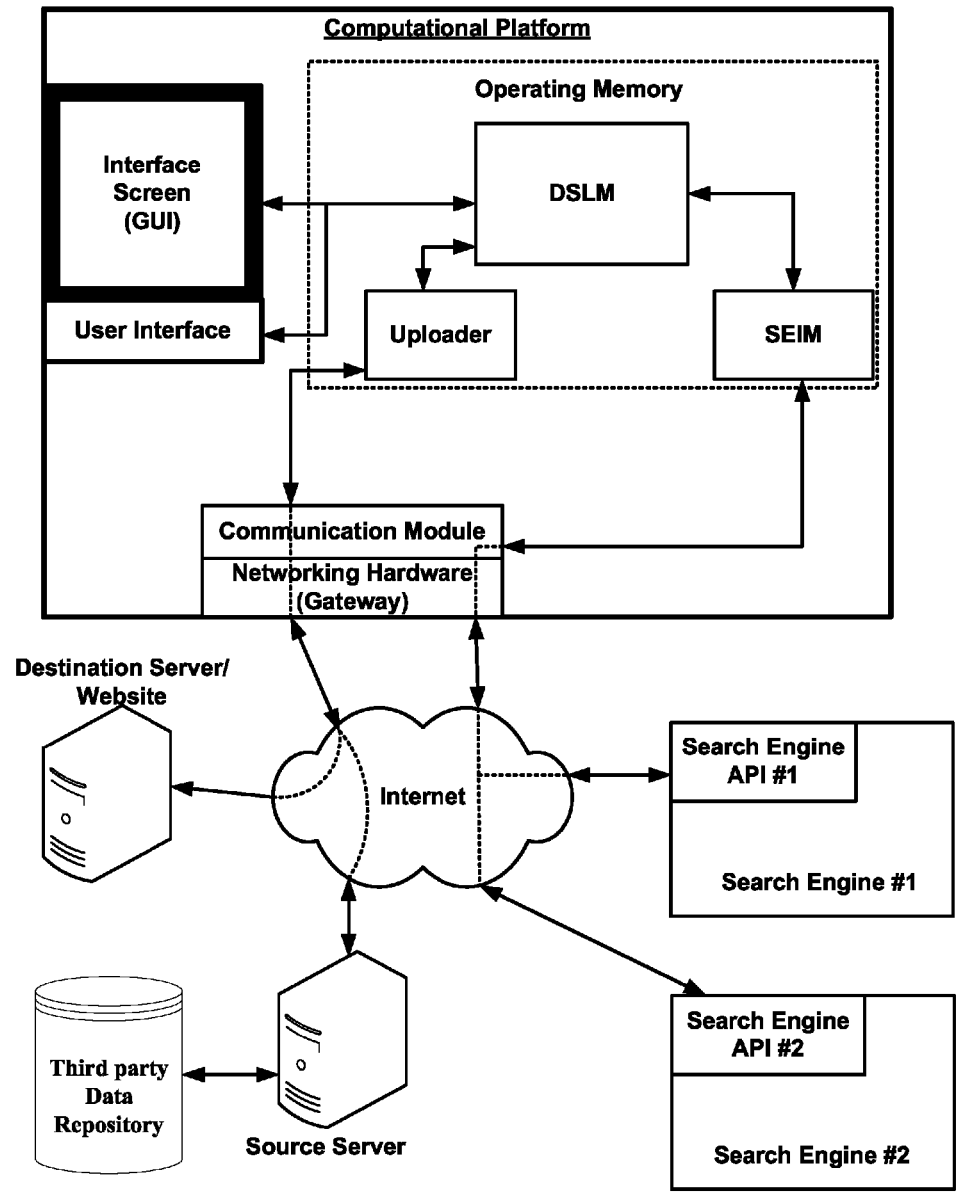
FIG. 2: is a block diagram of an exemplary system for managing data files/objects, in which files or data objects are uploaded directly from an external server, in accordance with some embodiments of the present invention.
Figure 3:
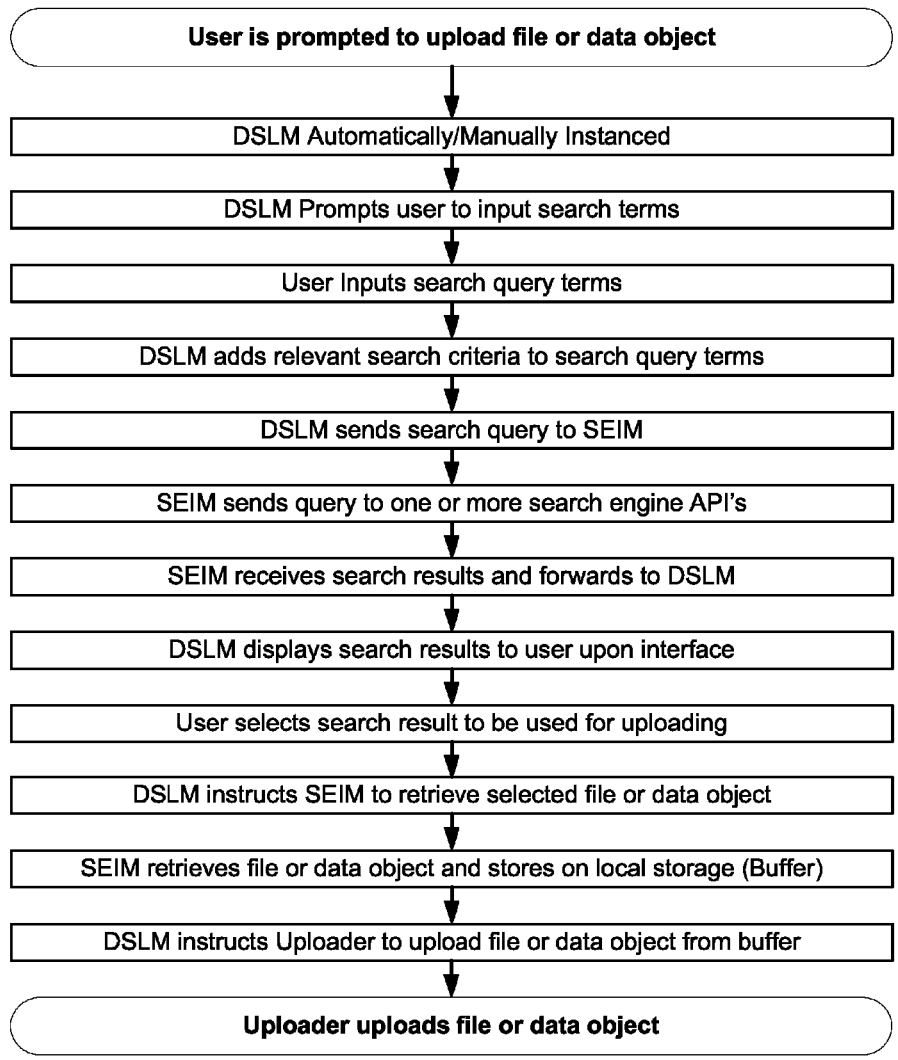
FIG. 3: is a flowchart including steps of an exemplary method for managing data files/objects, in which data files/objects are stored in a local buffer or storage prior to being uploaded, in accordance with some embodiments of the present invention.
Figure 4:
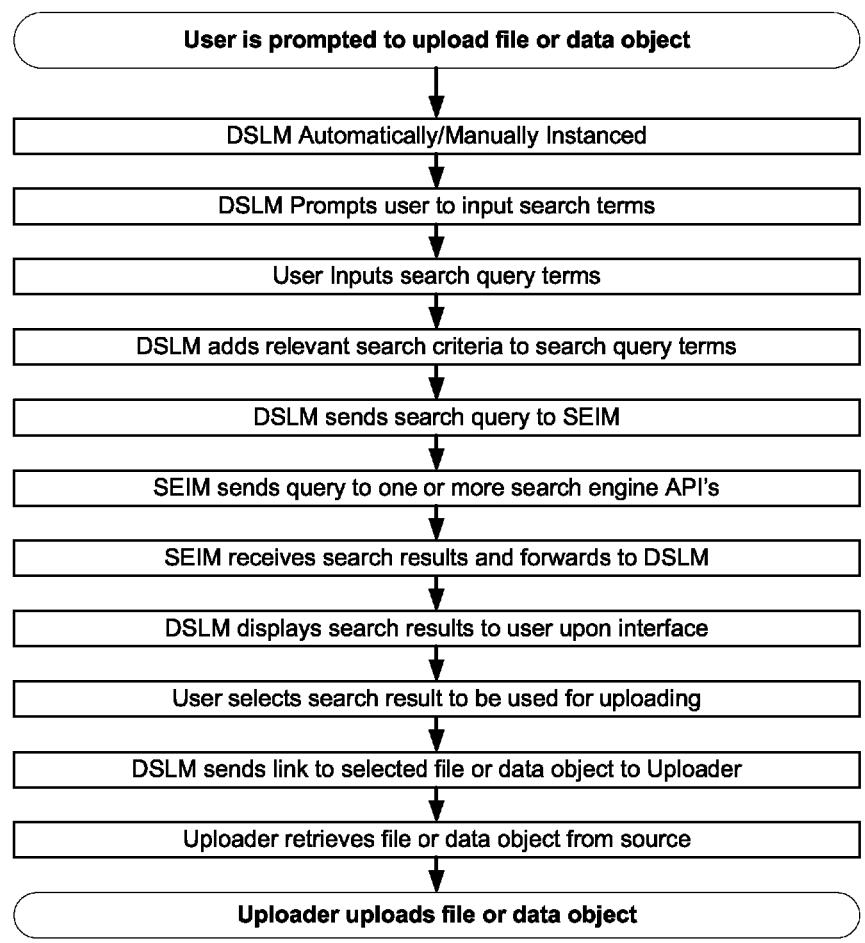
FIG. 4: is a flowchart including steps of an exemplary method for managing data files/objects, in which files or data objects are uploaded directly from an external server, all in accordance with some embodiments of the present invention.
Figure 5:
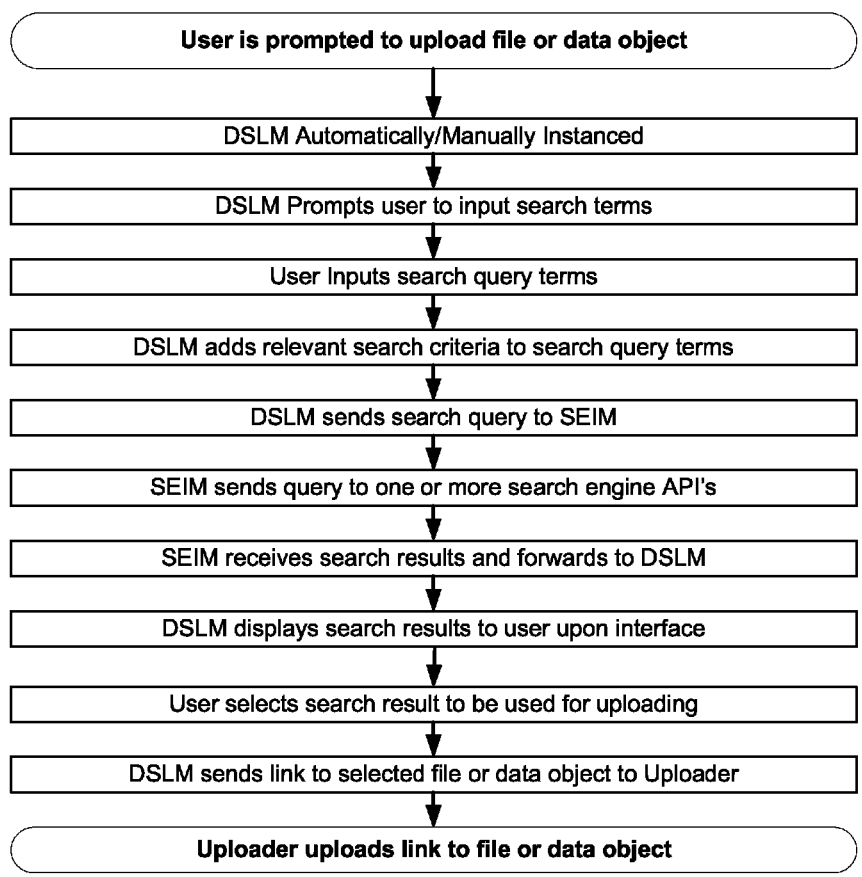
FIG. 5: is a flowchart including steps of an exemplary method for managing data files/objects, in which links to files or data objects are uploaded to a destination server or website, all in accordance with some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

It should be understood that the accompanying drawings are presented solely to elucidate the following detailed description, are therefore, exemplary in nature and do not include all the possible permutations of the present invention.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. The term server may refer to a single server or to a functionally associated cluster of servers.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, memory cards (for example SD card), SIM cards, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer, communication device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language or markup language. It will be appreciated that a variety of programming languages or techniques may be used to implement the teachings of the inventions as described herein.

It should be understood that any topology, technology and/or standard for computer networking (e.g. mesh networks, infiniband connections, RDMA, etc.), known today or to be devised in the future, may be applicable to the present invention.

The present invention includes methods, circuits, systems and corresponding executable code for locating and managing data files/objects such as image files, audio files, etc. According to some embodiments of the present invention, there may be provided a Dynamic Search and Linking Module (DSLM), which DSLM may be functionally associated with an Uploader (an application or module adapted to upload files) of an application (including locally running applications and/or remotely running applications) or of an operating system. The DSLM may provide an Uploader with search engine querying (e.g. web searching) and search engine result (e.g results of a web search) linking functionality. The DSLM may be automatically instanced or may otherwise become visible when an Uploader prompts a user for a file selection. The DSLM may thereafter provide the user with options to respond to the Uploader file selection prompt/request with (1) a search engine query, and/or (2) a search engine result selection—such that a selected search engine result is dynamically linked as the input to the file selection prompt, field, pointer or other designator used by the Uploader to designate a file (location) to upload.

According to some embodiments of the present invention, a DSLM may be installed or otherwise functionally associated with a File-System/data-repository Explorer/browser or other computational platform file managing/locating system (hereinafter collectively referred to as: a "CB", examples of CB's may further include: iPad applications, Android/iPhone/other SmartPhone applications, standard PC websites, mobile web sites and HTML 5) and the DSLM may, either directly or through the CB, be functionally associated with a graphic user interface (GUI) of any type known today or to be devised in the future. The DSLM may remain inactive or otherwise operating in the background until either: (1) a user instances the DSLM, and/or (2) the DSLM is automatically instanced by the CB. The CB or user may instance the DSLM whenever there is a need to upload a file or data object to a remote server and/or a running application (e.g. when a user fillable field in a form requires a file or data object—such as a profile picture) (hereinafter the remote server or application requiring the upload of a file or data object will collectively be referred to as the "Destination server", wherein destination server should be understood to include a locally running application requesting the upload of a file or data object and/or a remote server requesting such an upload). When instanced the DSLM may either augment the functionality (e.g. as a plug-in) of a CB, may replace the CB and/or may operate in parallel to the CB when called by an application or web-form requesting user selection of a file (e.g. for uploading).

According to some embodiments of the present invention, when a DSLM is instanced it may prompt the user, via the GUI, to enter one or more search query terms or other indications/characterizations of the file or data object the user desires to upload.

According to some embodiments of the present invention, the DSLM may include or be functionally associated with a Search Engine Interface Module (SEIM) adapted to communicate with an API of a search engine (e.g. Google) and/or with an internal search engine (ISE) adapted to search the internal memory of the computational platform the DSLM is operating in, and/or any other data repository. The DSLM may forward to the SEIM and/or ISE, the inputted search query terms or other indications/characterizations of the file or data object the user desires to upload. According to further embodiments of the present invention, a DSLM may be further adapted to automatically add and/or modify search criteria, based on: (1) the purpose for which the file/data object is needed (i.e. if the field to be filled out requires a logo, the DSLM may add the term "Logo" to the search criteria), (2) user preferences (e.g. a user may prefer files from certain sources or of a minimum quality, etc.), (3) regional characteristics (e.g. language), (4) specific requirements of the application or server to which the file/data object is being uploaded (e.g. a specific field may allow only pdf files), and/or (5) any other related criteria.

According to further embodiments of the present invention, a SEIM, when receiving search query terms or other indications/characterizations of a file or data object, may forward these terms or indications to one or more search engines, via the appropriate API's, and receive from the Search Engines search results in one or more formats (e.g. lists, images, thumbnails, etc.). These search results may then be forwarded to the DSLM or displayed directly to the user. Similarly, an ISE, when receiving search query terms or other indications/characterizations of a file or data object, may perform a search of the internal memory of the computational platform the DSLM is operating in, and/or any other data repository it is associated with, to locate files and/or data objects related to the search query. The ISE may also forward the results of its search to the DSLM or directly to the user in one or more formats.

A DSLM receiving search results from a SEIM and/or an ISE, may display the results (i.e. indications of the content of data objects included in the results) to the user upon the GUI in any appropriate format (e.g. lists, images, thumbnails, etc.) and may prompt the user to select one or more of the results. According to some further embodiments of the present invention, the DSLM may be adapted to allow a user to select the format on which he/she desires to see the search results. According to yet further embodiments of the present invention a DSLM may automatically select formats in which to present results, based on a user history or preference (e.g. if a user consistently selects black and white images, the DSLM may sort images accordingly), According to some embodiments, the DSLM may be further adapted to provide a user with an option to refine and/or modify his/her search criteria and to update the results accordingly.

According to some embodiments of the present invention, once a user has selected a file or data object to be uploaded from the displayed search results, the DSLM may, directly or via the SEIM, download the selected file or data object from the source server/data-repository (i.e. retrieve the selected file or data object from its source) and store the file or data object on a local data storage (buffer). According to some embodiments the local data storage (buffer) may not actually physically reside on the same computational platform, rather on an exterior server functionally associated, possibly via a distributed data network, with the DSLM. Once the file or data object has been stored on a buffer, the DSLM may forward a pointer or other indicator to the uploader, indicating the location of the file or data object on the buffer, and further instruct the uploader to upload the indicated file or data object to the destination server. Accordingly, the Uploader may retrieve the file or data object from the buffer and upload it to the destination server.

According to further embodiments of the present invention, in place of retrieving the file or data object from the source and storing it on a buffer, the DSLM may forward to the uploader a link or pointer (e.g. web pointer) to the source location of the file or data object and instruct the uploader to upload the file or data object directly from the source to the destination server. Accordingly, once instructed, the uploader may retrieve the file or data object from the source and upload it directly to the destination server. According to yet further embodiments of the present invention, when dealing with a destination server which allows the uploading of a link or pointer to a file or data object in place of the file or data object itself, the DSLM may forward to the uploader the pointer or link to the file and instruct it to upload the pointer or link to the destination server. Accordingly, the uploader may upload the pointer or link to the destination server, such that the destination server may upload the file or data object directly from the source.

It should be understood by one of skill in the art that some of the functions described as being performed by a specific component of the system may be performed by a different component of the system in other embodiments of this invention.

The present invention can be practiced by employing conventional tools, methodology and components. Accordingly, the details of such tools, component and methodology are not set forth herein in detail. In the previous descriptions, numerous specific details are set forth, in order to provide a thorough understanding of the present invention. However, it should be recognized that the present invention might be practiced without resorting to the details specifically set forth.

In the description and claims of embodiments of the present invention, each of the words, "comprise" "include" and "have", and forms thereof, are not necessarily limited to members in a list with which the words may be associated.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

EXEMPLARY EMBODIMENTS

Following are descriptions of an exemplary flow and an exemplary code according to some specific exemplary implementations of the present invention. These following specific exemplary embodiments of the present invention are presented to further clarify the present invention and the possible implementations of its principles, and as such, should not be understood to encompass the full scope of the present invention in any way. It should be clear to anyone of ordinary skill in the art that many other implementations of the present invention are possible.

Exemplary basic flow—following is an exemplary flow of an exemplary method in accordance with some embodiments of the present invention.

A. A user seeks to add a data object to part of a web based form. (While common fields such as: name, address and email can be filled in manually, a new content field (e.g. an image to be used as an icon) cannot be filled because the user is using an operating system which limits direct access to files).

B. The user activates a DSLM or a DSLM is instanced automatically.

C. The user may type in text in a free form text box and may click on a button to generate a search.

D. The search may be conducted in a seamless way so the user may understand a search was made, but the results may be embedded within a web site.
E. Some additional terms or filters may be automatically added to the search, for example, the word "logo" may be added, and the search may only apply to "images" or "videos".
F. The search results may be embedded within the website and the user may select one or more of the search results to be used for the field in question.
G. Once the user has selected an object or image, it may be saved to the hosting server and a database field may link to it. The database field may be included in the same row as the other fields of the form: name, email, address, and so on . . . .
H. When the fields in the form are loaded on another page of the website, the web site may fetch the local copy of the object or image and present it to the user, similarly to the way the web site may display an image uploaded using a standard file system.

Exemplary pseudo code—following is an exemplary pseudo code, including explanatory comments, exemplifying a possible implementation of the present invention:

```
This web form is dynamically built and
has 3 stages.
1) the form has no dynamically built
item, and a search text box.
2) after the user enters the search
parameters the items (pictures
implemented as buttons) are dynamically
built.
3) An image is selected, starting a
process that will download it and link
it to the database on the server side
        /// </summary>
        public partial class WebForm3 :
System.Web.UI.Page
        {
            /// </summary>
            /// The idea is to build the
buttons when the page load using the
users search parameters
            /// </summary>
            protected void Page_Load(object
sender, EventArgs e)
            {
                // Change MassageBoard to
user instructions - so the user will
see the following message
((SiteMaster)this.Master).MassageBoard.
Text = "Pick a category, enter desired
website, click 'Find Logo' and choose
your new link's logo";
// Check if it is the first time the
page is loaded or its a postback
                if (Page.IsPostBack)
                {
// dynamically build buttons
                    PostBack_Build ( );
                }
                else
                {
                    if (null ==
Request.Cookies["UserId"] || null ==
Session["IsCounterEmpty"])
                    {
Response.Redirect(" ~/Default.aspx");
                    }
                    if
((bool)Session["IsCounterEmpty"])
                    {
                        TableBuilder tb =
new TableBuilder(Response, Server,
```

-continued

```
Session, false);
                        if
(tb.CreateDefaultLinks ( ))
                        {
Response.Cookies["UserId"].Value =
(string)Session["UserId"] + @" | n";
Session["IsCounterEmpty"] = false;
                        }
                    }
                }
            }
// Load DropDownList1 with items so the
user can connect the image with a
category in the database
            if (0 ==
DropDownList1.Items.Count)
            {
                DataClasses1DataContext
dc = new DataClasses1DataContext ( );
                try
                {
                    var q = from a in
dc.GetTable<category> ( )
                        orderby
a.categoryName
                        select a;
                        foreach (var a in
q)
                        {
DropDownList1.Items.Insert(DropDownList
1.Items.Count, a.categoryName);
                        }
                }
            }
            /// <summary>
            /// Call then a button is
clicked and then:
            /// 1) Add the new selected
object data to DB
            /// 2) Save the new object on
the server
            /// 3) Redirect back to the
form
            /// </summary>
            private void
NewLinkClick(object sender,
ImageClickEventArgs e)
            {
                DataClasses1DataContext dc
= new DataClasses1DataContext ( );
                ImageButton clickedButton =
(ImageButton)sender;
                if (string.Empty !=
clickedButton.CommandArgument)
                {
// we have this link the the DB
                    try
                    {
// add the 'click' to counter table
                        counter newCounter
= new counter( );
                        newCounter.id =
Guid.NewGuid( );
newCounter.lastClick = DateTime.Now;
newCounter.userCount = 1;
newCounter.countDown = 6;
newCounter.linkId = new
Guid(clickedButton.CommandArgument);
newCounter.userId = new
Guid((string)Session["UserId"]);
dc.counters.InsertOnSubmit(newCounter);
                        dc.SubmitChanges( );
                    }
                    catch(Exception ex)
                    {
Trace.Write("NewLinkClick - link the
the DB- " + ex.Message);
                    }
// prepare address
                    string address = null;
                    try
```

```
            {
                address = new
UriBuilder((string)Session["lastLinkSea
rched"]).ToString ( );
            }
            catch (Exception)
            {
                TextBox1.Text =
"Invalid Input";
                return;
            }
            // Save the object on
server for any future use
            string category =
DropDownList1.SelectedValue;
            Uri imageWebUrl = null;
            string imageNameOnServer =
null;
            string imageName = null;
            try
            {
                imageWebUrl = new
UriBuilder(clickedButton.ImageUrl).Uri;
                imageNameOnServer =
imageWebUrl.Host;
                string[ ] temp =
imageWebUrl.ToString( ) .Split('/' );
                imageNameOnServer +=
"(" + (string)Session["UserId"] + ")."
+ temp [temp.Count ( ) – 1];
                imageName =
imageNameOnServer;
                imageNameOnServer =
Server.MapPath("images/users/ " +
imageNameOnServer);
                WebClient webClient =
new WebClient( );
webClient.DownloadFile(imageWebUrl,
imageNameOnServer);
                webClient.Dispose( );
            }
            catch (Exception ex)
            {
Trace.Warn(string.Format("NewLinkClick
- %s", ex.Message));
            }
            // Add link data to db
            try
            {
                category q = (from a in
dc.GetTable<category>( )
                               where
a.categoryName == category
                               select
a).Single ( );
                // Add the new link to
links table
                link newLink = new
link( );
                newLink.id =
Guid.NewGuid( );
                newLink.catagoryId =
q. id;
                newLink.width = null;
                newLink.isUserDefined =
true;
                newLink.address =
address;
                newLink.@default =
false;
                newLink.imagePath =
imageName;
                // add the 'click' to
counter table
                counter newCounter =
new counter( );
                newCounter.id =
Guid.NewGuid( );
                newCounter.lastClick =
DateTime.Now;
                newCounter.userCount =
1;
                newCounter.countDown =
6;
                newCounter.linkId =
newLink.id;
                newCounter.userId = new
Guid((string)Session["UserId"]);
dc.counters.InsertOnSubmit(newCounter);
dc.links.InsertOnSubmit(newLink);
                dc.SubmitChanges( );
            }
            catch (Exception ex)
            {
Trace.Write("DataClasses1DataContext
Exception " + ex.Message);
            }
            dc.Dispose( );
Session["lastLinkSearched"]
= null;
                Session["gSearchResults"] =
null;
Response.Redirect("~/Default.aspx");
        }
        /// <summary>
        /// The point behind this is to
call a postback and create the buttons.
        /// </summary >
        protected void
Button1_Click(object sender, EventArgs
e)
        {
            return;
        }
        /// <summary>
/// This function does the following
things:
/// 1) using the users parameters to
search for the image using google api.
/// 2) dynamically build imageButtons.
        /// </summary>
        private void PostBackBuild( )
        {
            UriBuilder uriBuilder =
null;
            if (null ==
Session["lastLinkSearched"])
            {
Session["lastLinkSearched"] =
TextBox1.Text;
            }
            else
            {
                if (TextBox1.Text !=
(string)Session["lastLinkSearched"])
                {
PlaceHolder1.Controls.Clear( );
PlaceHolder2.Controls.Clear( );
Session["gSearchResults"] = null;
Session["lastLinkSearched"] =
TextBox1.Text;
                }
            }
            try
            {
                if (" " !=
TextBox1.Text)
                {
                    // add try
                    uriBuilder = new
UriBuilder(TextBox1.Text);
                }
                else
                {
                    TextBox1.Text =
"Invalid Input";
                    return;
                }
            }
            catch (Exception)
```

-continued

```
        {
            TextBox1.Text =
"Invalid Input";
            return;
        }
// check if link in DB and add
"Suggested Link"
        DataClasses1DataContext dc
= new DataClasses1DataContext( );
        try
        {
            link q = (from a in
dc.GetTable<link>( )
            where
SqlMethods.Like(a.address, "%" +
uriBuilder.Uri.Host + "%")
            select
a) .Single ( );
            Label 1 = new Label( );
            1.Text = "Suggested
Link";
            1.Font.Size = 15;
PlaceHolder1.Controls.Add(1);
PlaceHolder1.Controls.Add(new
LiteralControl(@"<br />"));
            ImageButton newImage =
new ImageButton ( ) ;
newImage.CommandArgument =
q.id.ToString( );
            newImage.CssClass =
"add";
            newImage.ImageUrl =
"~/images/"+ q.imagePath;
            newImage.Width =
(int)q.width;
PlaceHolder1.Controls.Add (newImage);
        }
        catch (Exception)
        {
            Trace.Write("link not
in db");
        }
// check if any images are saved in
session, if not search them in google
images and save the in the session.
// Add the string " logo" to the Search
String the user enters to get more
relevant images. (e.g. "IBM logo" when
the user entered "IBM" )
        IList<IImageResult>
results;
        if (null !=
Session["gSearchResults "])
        {
            results =
(IList<IImageResult>)Session["gSearchRe
sults"];
        }
        else
        {
            GimageSearchClient
gsearch = new
GimageSearchClient("http://www.ipadhome
page.com");
            results =
gsearch.Search(uriBuilder.Uri.Host + "
logo" , 30) ;
        }
// build images if any
exists
        if (0 == results.Count)
        {
            return;
        }
        foreach (IImageResult
result in results)
        {
            try
            {
                ImageButton
```

```
                newImage = new ImageButton( );
                newImage.ImageUrl =
result.TbImage. Url;
                if (200 <
result.TbImage.Width)
                {
                    newImage.Width
= 200;
                }
                else
                {
                    newImage.Width
= result.TbImage.Width;
                }
                newImage.Click +=
new
ImageClickEventHandler(this.NewLinkClic
k);
                newImage.CssClass =
"link";
PlaceHolder2.Controls.Add(newImage);
            }
```

The invention claimed is:

1. A method for uploading application requested data objects to a destination server, said method comprising:
receiving, upon a computational platform in which files stored on the computational platform are masked from a user of the computational platform, a request from an application running on the computer platform for an upload of a data object;
instancing, upon the computational platform, an uploader window including a user input field and a search-engine interface module;
receiving through the user input field of the uploader window, user input terms to be used as a search engine query;
transmitting, through the search engine interface module, the search engine query to one or more search engine application programming interfaces (API's);
receiving a set of web pointers in response to the search engine query; displaying upon a graphic user interface (GUI) associated with the uploader window indications of a content of one or more data objects associated with one or more of the web pointers;
receiving, through the GUI, a user selection of one or more of the web pointers; and
automatically uploading, through the uploader window, data associated with the user selected web pointers.

2. The method according to claim 1, wherein the data associated with the user selected web pointers includes the data object associated with each selected web pointer.

3. The method according to claim 1, further comprising downloading the data associated with the user selected web pointers to a buffer prior to said uploading.

4. The method according to claim 1, further comprising automatically adding one or more terms to the search engine query, prior to transmitting the query to the API's.

5. The method according to claim 4, wherein the added terms are associated with a nature of the request from the application.

6. The method according to claim 4, wherein the added terms are associated with a user preference.

7. The method according to claim 4, wherein the added terms are associated with a geographical location of the user.

8. The method according to claim 1, wherein the indications displayed to the user are presented in a format selected by the user.

9. A system for uploading application requested data objects to a destination server, said system comprising:
- an instancer configured to instance, upon a computational platform in which files stored on the computational platform are masked from a user of the computational platform, an uploader window including a user input field and a search-engine interface module (SEIM), which SEIM is, communicatively coupled to one or more search engine application programming interfaces (API's), and configured to: (1) receive through the user input field user input terms to be used as a search engine query; and (2) send the search engine query to the API's and receive sets of web pointers in response to the search engine query;
- wherein said instancer is configured to perform the instancement in response to a request from an application running on the computer platform for an upload of a data object;
- a dynamic search and linking module (DSLM), configured to: (1) display to the user upon a graphic user interface (GUI) associated with said uploader window indications of a content of one or more data objects associated with one or more of the web pointers; and (2) receive, through the GUI, a user selection of one or more of the web pointers; and
- an uploader configured to upload, through the uploader window, data associated with the user selected web pointers to the destination server.

10. The system according to claim 9, wherein the data associated with the user selected web pointers includes the data object associated with each selected web pointer.

11. The system according to claim 9, wherein said DSLM is further configured to download the data associated with the user selected web pointers to a buffer.

12. The system according to claim 9, wherein said SEIM is further configured to automatically add one or more terms to the search engine query, prior to forwarding the query to the API'.

13. The system according to claim 12, wherein the added terms are associated with a nature of the request from the application.

14. The system according to claim 12, wherein the added terms are associated with a user preference.

15. The system according to claim 12, wherein the added terms are associated with a geographical location of the user.

16. A system for uploading application requested data objects to a destination server, said system comprising:
- a processor functionally associated with a digital memory, which digital memory stores processor executable code adapted to cause one or more processors to provide:
- an instancer configured to instance, upon a computational platform in which files stored on the computational platform are masked from a user of the computational platform, an uploader window including a user input field and a search-engine interface module (SEIM), which SEIM is communicatively coupled to one or more search engine application programming interfaces (API's), and configured to: (1) receive through the user input field user input terms to be used as a search engine query; and (2) send the search engine query to the API's and receive sets of web pointers in response to the search engine query;
- wherein said instancer is configured to perform the instancement in response to a request from an application running on the computer platform for an upload of a data object;
- a dynamic search and linking module (DSLM) configured to: (1) display to the user upon a graphic user interface (GUI) associated with said uploader window indications of a content of one or more data objects associated with one or more of the web pointers; and (2) receive, through the GUI, a user selection of one or more of the web pointers; and
- an uploader configured to upload, through the uploader window, data associated with the user selected web pointers to the destination server.

17. The system according to claim 16, wherein said SEIM is further configured to automatically add one or more terms to the search engine query, prior to forwarding the query to the API's.

18. The system according to claim 17, wherein the added terms are associated with a nature of the request from the application.

19. The system according to claim 17, wherein the added terms are associated with a user preference.

20. The system according to claim 17, wherein the added terms are associated with a geographical location of the user.

* * * * *